United States Patent [19]

Sano et al.

[11] Patent Number: 5,070,267
[45] Date of Patent: Dec. 3, 1991

[54] LOW-NOISE ELECTRIC MOTOR ASSEMBLY FOR AUTOMOTIVE BLOWER

[75] Inventors: Takenosuke Sano; Keiichi Koike, both of Tokyo; Hajime Sato, Yokohama; Toshihiro Kimura; Yutaka Enokido, both of Yokosuka, all of Japan

[73] Assignees: Calsonic Corporation, Tokyo; Nissan Motor Co., Ltd., Yokohama, both of Japan

[21] Appl. No.: 482,938

[22] Filed: Feb. 21, 1990

[30] Foreign Application Priority Data

Feb. 22, 1989 [JP] Japan ................................. 1-42727

[51] Int. Cl.$^5$ ............................................... H02K 13/00
[52] U.S. Cl. ..................... 310/89; 310/68 R; 236/49.3
[58] Field of Search ..................... 310/89, 62, 63, 154, 310/261, 233, 248, 68 R; 318/811, 599; 236/13, 49.2

[56] References Cited

U.S. PATENT DOCUMENTS

| | | | |
|---|---|---|---|
| 4,086,510 | 4/1978 | Watanabe | 310/248 |
| 4,785,225 | 11/1988 | Horie | 318/811 |
| 4,811,897 | 3/1989 | Kobayashi et al. | 236/49.4 |
| 4,897,571 | 1/1990 | Isozumi | 310/89 |
| 4,942,921 | 7/1990 | Haessig et al. | 236/13 |

FOREIGN PATENT DOCUMENTS

| | | | |
|---|---|---|---|
| 60-148154 | 5/1985 | Japan | 310/89 |
| 63-153542 | 10/1988 | Japan | 310/89 |

Primary Examiner—Steven L. Stephan
Assistant Examiner—Matthew Nguyen
Attorney, Agent, or Firm—Foley & Lardner

[57] ABSTRACT

An electric motor assembly for driving an air blower is disclosed. The assembly comprises a casing of metal, the casing having opposed open ends closed by respective covers of metal; a rotation shaft rotatably disposed in the casing, the rotation shaft having one end exposed to the outside through an opening formed in one of the covers, the one end being adapted to connect to a fan of the air blower; a plurality of magnets installed in the casing and circumferentially surrounding the rotation axis; an armature mounted to the rotation shaft to rotate therewith; a commutator mounted to the rotation shaft and electrically connected with the armature; brushes operatively contacting with the commutator and supported by the casing; and an electric power feeding device for feeding the brushes with an electric power. A pulse width modulating device is further employed which is electrically connected with the power feeding device for modulating the electric power by means of a pulse width modulation method. The pulse width modulating device is installed in the casing for radio noise suppression.

12 Claims, 3 Drawing Sheets

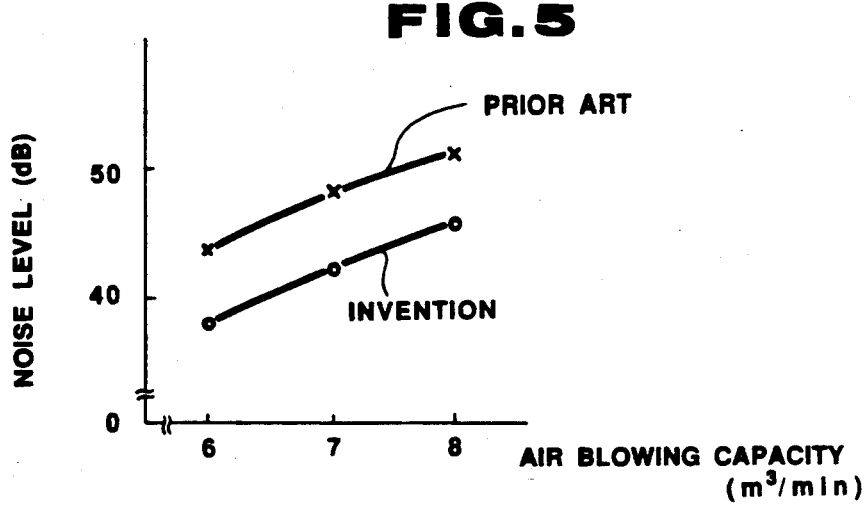
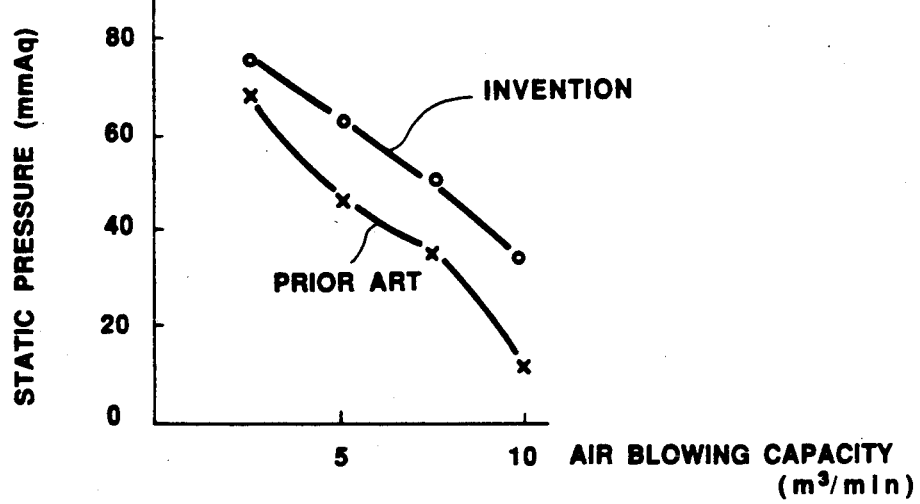
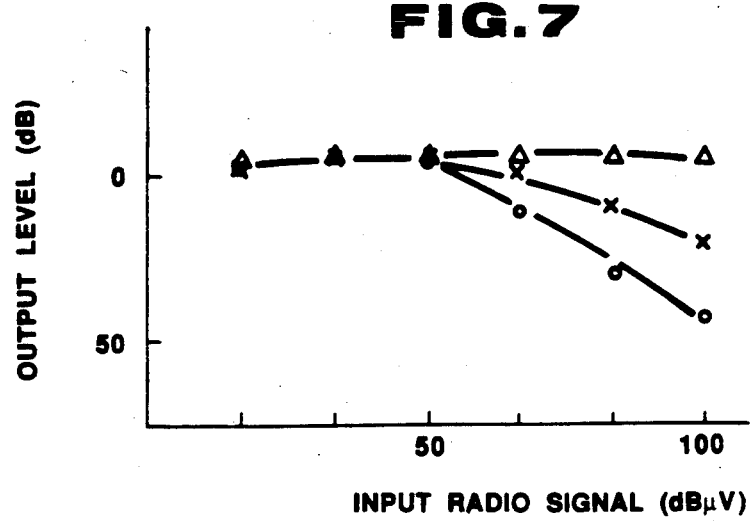

LOW-NOISE ELECTRIC MOTOR ASSEMBLY FOR AUTOMOTIVE BLOWER

BACKGROUND OF THE INVENTION

1. Field of the Invention

The present invention relates in general to electric motors for driving an automotive blower, and more particularly, to the electric motors of a low-noise type. More specifically, our present invention is concerned with a low-noise motor assembly for an automotive blower, being installed therein a rotation speed controller including a pulse width modulating device.

2. Description of the Prior Art

An automotive blower comprises generally a fan, an electric motor for driving the fan and a speed controller for controlling the rotational speed of the electric motor. Among speed controllers hitherto employed, there is a type which uses a power transistor for functional and commercial superiority, in which the control of the rotation speed can be made in a stepless manner. For dealing with the considerable heat generated by the power transistor, the transistor is mounted to a heat sink which is located in a well-ventilated area. In fact, in case of an automotive air conditioner, the heat sink is exposed to an air passage defined in an air distributing unit of the air conditioner.

Some of the speed controllers of this power transistor type are shown in Japanese Patent First Provisional Publication No. 60-148,154 and Japanese Utility Model First Provisional Publication No. 63-153,542.

Recently, the field of automotive blowers shows a tendency to increase the air blowing capacity due to the need for supplying air to various areas a motor vehicle. While, in the field of the motor vehicles, there is a tendency to increase the number of electrically operated parts for easy with which the parts are manipulated by users.

However, these tendencies cause the power shortage of batteries and alternators mounted in the vehicles.

One of measures for solving this power shortage is to use a pulse width modulating device for controlling the rotation speed of the electric motor for the blower. In fact, this measure has induced a power saving in the electricity consumed in the motor vehicle. However, this measure has brought about a problem of radio noise caused by the pulses generated by the PWM (pulse width modulating device). Thus, hitherto, such measure has not been put to practical use.

SUMMARY OF THE INVENTION

It is therefore an object of the present invention to provide a motor assembly for driving an automotive blower, which is free of the radio noise problem even though the same is equipped with a pulse width modulating device.

According to the present invention, there is provided an electric motor assembly for driving an air blower. The assembly comprises a casing of metal, the casing having opposed open ends closed by respective covers of metal; a rotation shaft rotatably disposed in the casing, the rotation shaft having one end exposed to the outside through an opening formed in one of the covers, the one end being adapted to connect to a fan of the air blower; a plurality of magnets installed in the casing and circumferentially surrounding the rotation axis; an armature mounted to the rotation shaft to rotate therewith; a commutator mounted to the rotation shaft and electrically connected with the armature; brushes operatively contacting with the commutator and supported by the casing; an electric power feeding means for feeding the brushes with an electric power; and a pulse width modulating device electrically connected with the power feeding means for modulating the electric power by means of a pulse width modulation method, the pulse width modulating device being installed in the casing.

BRIEF DESCRIPTION OF THE DRAWINGS

Other objects and advantages of the present invention will become apparent from the following description when taken in conjunction with the accompanying drawings, in which:

FIG. 5 is a graph showing the characteristics of the present invention and the conventional motor assembly in terms of a relationship between the air blowing capacity and the noise level in an air distributing unit;

FIG. 6 is a graph showing the characteristics of the present invention and the conventional motor assembly in terms of a relationship between the air blowing capacity and the static pressure in the air distributing unit; and FIG. 7 is a graph showing the characteristics of the present invention and a reference example wherein a pulse width modulating device is arranged outside of the electric motor assembly, in terms of a relationship between the intensity of input radio signal and the output level.

DETAILED DESCRIPTION OF THE INVENTION

Figure 1:
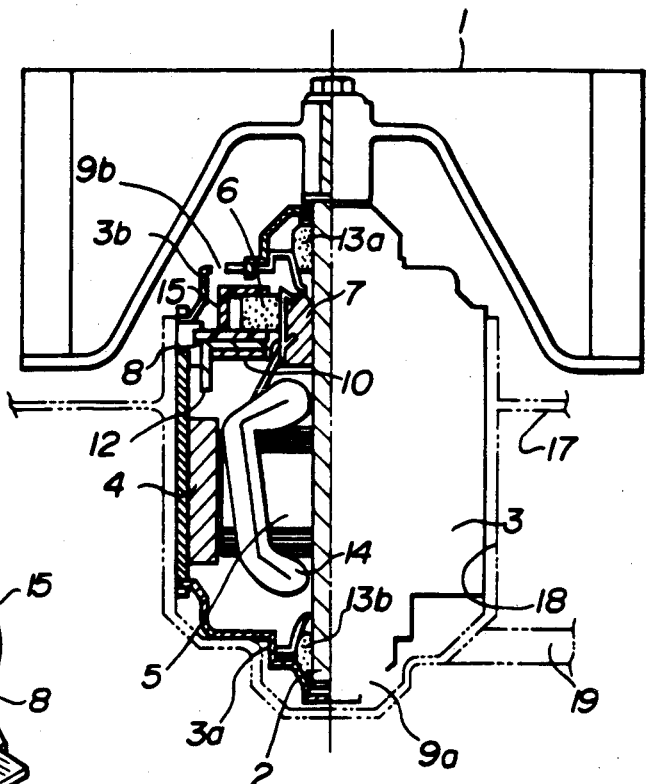
FIG. 1 is a half-sectional view of an electric motor assembly according to the present invention.

Referring to FIG. 1 of the accompanying drawings, there is shown an electric motor assembly according to the present invention, which is equipped with a fan of an air blower installed in an air distributing unit of an automotive air conditioner.

Although not shown in the drawings, the air distributing unit comprises generally an indoor air introducing duct, an outdoor air introducing duct, an air mixing chamber in which a switch door is arranged to fully and partly open and close these two introducing ducts and an air outlet duct from which the mixed air in the mixing chamber is introduced to an air conditioning device. The air thus conditioned by the air conditioning device is blown into a passenger room of the motor vehicle.

As is shown in FIG. 1, the electric motor assembly comprises a cylindrical casing 3 constructed 0 of an electrically condutive material, such as metal or the like. A plurality of magnets 4 are installed in the casing 3 in a manner to circumferentially surround the center axis of the casing 3. A rotation shaft 2 is rotatably and concentrically disposed in the casing 3 and has an armature 5 mounted thereto. Designated by numerals 13a and 13b are bearings for smoothing the rotation of the rotation shaft 2 relative to the casing 3. A commutator 7 is fixed to the rotation shaft 2, from which lead wires extend to a multi-turned coil 14 of the armature 5. Brushes 6 are supported on a brush base 8 of a suitable plastic, which brushes are in contact with the commutator 7.

Figure 2:
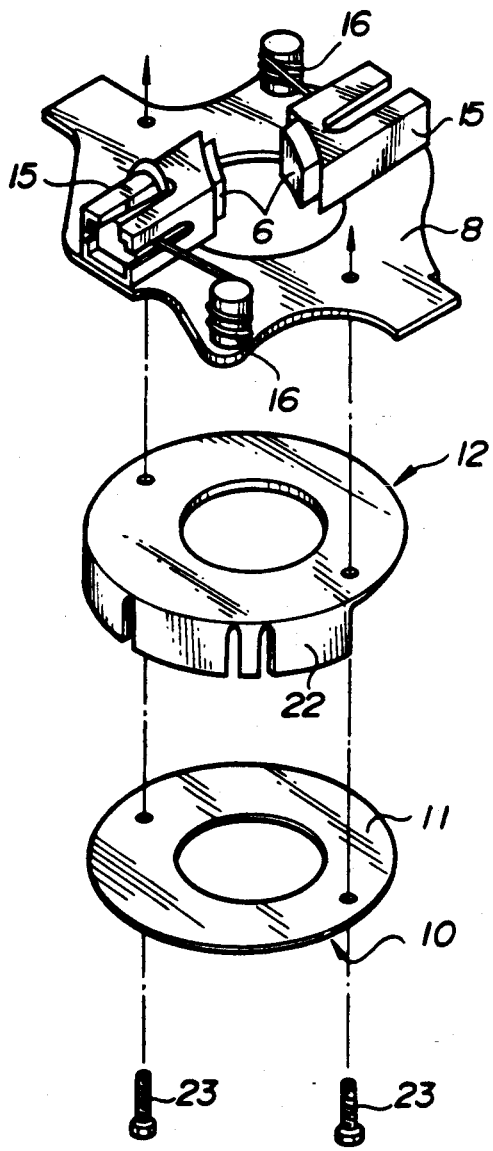
FIG. 2 is an exploded view showing a metal base plate, a radiating plate and a brush base, which are installed in the electric motor assembly of the present invention.

As is seen from FIG. 2, the brushes 6 are slidably received in respective brush holders 15 which are mounted on the brush base 8. Each brush 6 is biased toward the commutator 7 by a spring 16.

The casing 3 has axially opposed open ends which are respectively closed by stepped conical covers of metal 3a and 3b. The cover 3b has a center opening (no numeral) through which one end of the rotation shaft 2 is exposed to the outside of the casing 3. Each cover 3a or 3b is formed with a ventilation opening 9a or 9b. With provision of the ventilation openings 9a and 9b, the various parts installed in the casing 3 are cooled during operation of the motor assembly for the reason which will be described hereinafter.

The fan 1 is coaxially fixed to the exposed end of the rotation shaft 2 to rotate therewith. It is to be noted that the fan 1 is so constructed that upon rotation thereof, a negative pressure area is produced between the back side of the fan 1 and the cover 3b.

Designated by numeral 17 in FIG. 1 is a part of an air distributing unit, which has a recess 18 into which the electric motor assembly is tightly disposed having the fan 1 exposed to the air passage of the air distributing unit 17. The recess 18 has at its bottom portion an opening (no numeral) from which a ventilation pipe 19 extends to a downstream part of the air passage of the air distributing unit. Thus, upon operation of the electric motor assembly, cool air is forced to flow toward the back side of the fan 1 through the ventilation pipe 19, the bottom of the recess 18, the ventilation opening 9a, the interior of the casing 3 and the ventilation opening 9b. Thus, the parts in the casing 3 are well cooled.

Of course, such ventilation system is not necessary when heat generation in the casing 3 is low.

According to the present invention, the following unique measure is employed.

As will be understood from FIG. 1 and 2, a pulse width modulating device 10 is attached to a back side of the brush base 8. The modulating device 10 is a means for modulating the electric power applied to the brushes 6 by means of a so-called pulse width modulation method.

Figure 3:
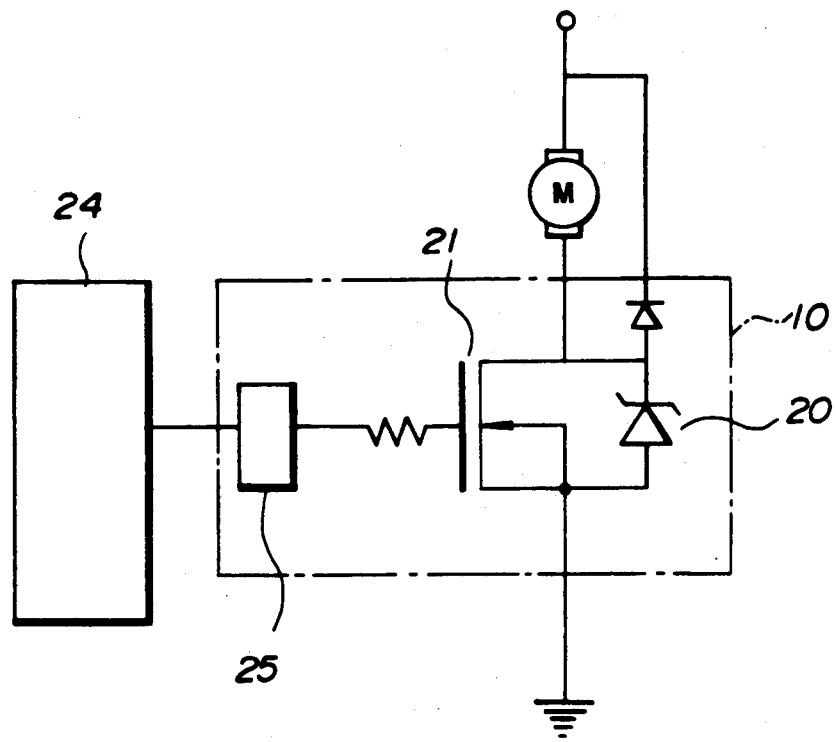
FIG. 3 is an electric circuit employed in the electric motor assembly of the invention.

As is seen from FIG. 3, the pulse width modulating device 10 comprises generally a pulse width modulating circuit 25, a zener diode 20 and a field effect transistor 21 which are mounted on a metal base plate 11 which is annular in shape (see FIG. 2). The base plate 11 may be constructed of steel, stainless steel, aluminium or the like.

Although not shown in the drawings, the metal base plate 11 has an insulating layer lined thereon. A suitable wiring of copper is printed on the insulating layer, and semiconductor tips are welded to the printed wiring.

Due to provision of the metal base plate 11, considerable heat generated by, for example, the field effect transistor 21 is instantly transmitted to the base plate 11 and thus the transistor 21 effectively cooled. Furthermore, because of the annular metal base plate 11, undesirable noises generated from the pulse width modulating device 10 are effectively blocked.

As is seen from FIG. 2, in order to more effectively cool the parts of the pulse width modulating device 10, an annular radiating plate 12 of metal is sandwiched between the brush base 8 and the metal base plate 11. The annular radiating plate 12 and the metal base plate 11 are arranged to surround the rotation shaft 2. The radiating plate 12 has radiation fins 22 integral therewith. Two bolts 23 are employed for joining the brush base 8, the radiating plate 12 and the metal base plate 11 together.

As is seen from FIG. 3, the control signal which is fed to the pulse width modulating device 10 to determine the pulse width is issued from a control means 24 of an automatic automotive air conditioner. In fact, in automatic air conditioners, there is employed a control means which controls the rotation speed of a blower fan by computing the desired temperature in a passenger room, the desired temperature at an air blowing port, and the like. A certain control signal from the control means 24 is fed to the pulse width modulating device 10 for modulating the pulse width of a voltage signal which is applied to the motor proper. In the disclosed embodiment, the electric power loss caused by the field effect transistor 21 is minimized due to the pulse width modulating driving.

In the following, advantages of the present invention will be described.

First, the undesired radio noise is suppressed or at least minimized due to the unique arrangement of parts around the pulse width modulating device 10. That is, because the device 10 is installed in the enclosed casing 3, the undesired radio noise from the device 10 is blocked by the casing 3. Furthermore, due to provision of the metal base plate 11 on which the pulse width modulating device 10 is mounted, the radio noises generated by the device 10 are effectively blocked by the base plate 11. Furthermore, because the pulse width modulating device 10 is positioned very near the brushes 6, any wiring therebetween is very shortened and thus the radio noise emission is minimized.

This desirable phenomenon will be well understood from the graph of FIG. 7 which shows the relationship between the intensity of the input radio signal and the output level in two cases, one being the case of the electric motor assembly of the present invention, which is shown by the curve plotted with "○" and the other being the case of a reference example in which the pulse width modulating device 10 is arranged outside of the casing 3, which is shown by the other curve plotted with "x". The curve plotted with "Δ" represents the input signal level. As will be seen from this graph, in a higher part of the input signal level, the S/N ratio between the input signal and the PWM noise in case of the present invention is much greater than that in case of the reference example. In fact, the noise emitted from the motor assembly of the invention is in the dimension of background noises (plotted with "●").

Second, the pulse width modulating device 10 can be effectively cooled. That is, due to the forced ventilation as described hereinabove, the parts including the pulse width modulating device 10, which are installed in the casing 3, are effectively cooled during operation of the electric blower.

Third, electric power loss can be minimized. That is, due to usage of the pulse width modulating device 10 for controlling the rotation speed of the motor assembly, electric power saving is effected.

Figure 4:
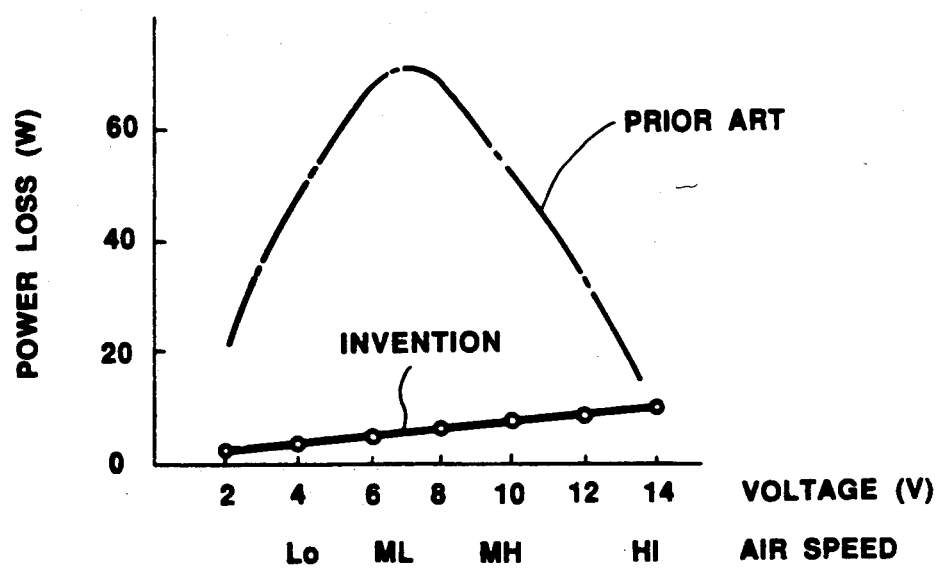
FIG. 4 is a graph showing the characteristics of both the electric motor assembly of the present invention and a conventional electric motor assembly, in terms of a relationship between a voltage applied to the motor assembly and an electric power loss.

This will be understood from the graph of FIG. 4 which shows the relationship between the voltage applied to the motor assembly and the electric power loss in two cases, one being the case of the present invention, which is shown by the curve plotted with "○", and the other being the case of the prior art in which a power transistor is used, which is shown by the phantom line curve. As will be seen from this graph, about a 55 W power saving is expected from the present invention as compared with the prior art.

Fourth, air flow resistance in an air distributing unit can be reduced. That is, since substantially all parts are installed in the casing 3 and the casing 3 is compactly disposed in the air distributing unit, the air flow resistance in the unit is minimized allowing a larger quantity of air flow.

This desirable phenomenon will be understood from the graph of FIG. 6 which shows a relationship between the air blow capacity and the static pressure in two cases, one being the case of the invention, which is shown by the curve plotted with "○", and the other being the case of the prior art in which a power transistor is exposed to the air flow passage of the air distributing unit, which is shown by the curve plotted with "x". As will be seen from this graph, at the same static pressure, much greater air blowing capacity is expected from the invention as compared with the prior art.

The reduction in flow resistance in the air distributing unit brings about also reduction in acoustic noise caused by the air which flows in the air distributing unit.

This will be understood from the graph of FIG. 5 which shows a relationship between the air blow capacity and the noise level in the two cases, one being the case of the invention and the other being the case of the prior art.

What is claimed is:

1. An electric motor assembly for driving an air blower, comprising:
    a metal casing having opposed open ends each closed by respective metal covers;
    a rotation shaft rotatably disposed in said casing, one end of which is exposed to the outside of said casing through an opening formed in one of said covers and is connected to a fan of said air blower;
    a plurality of magnets installed in said casing circumferentially surrounding the rotation axis of the shaft;
    an armature mounted on said rotation shaft to rotate therewith;
    a commutator mounted on said rotation shaft and electrically connected to said armature;
    brushes operatively contacting said commutator and supported by said casing;
    an electric power feeding means operatively connecting said brushes with an electric power source;
    and a pulse width modulating device electrically connected to said power feeding means for pulse width modulating the electric power from said electric power source, said pulse width modulating device being installed completely in said casing to prevent radio noises produced by the pulse width modulating device from escaping to the surroundings.

2. An electric motor assembly as claimed in claim 1, in which said pulse width modulating device is mounted on a metal base plate in said casing.

3. An electric motor assembly as claimed in claim 2, in which said metal base plate is connected to a brush base which has said brushes supported thereon, said brush base being secured to said casing.

4. An electric motor assembly as claimed in claim 3, further comprising a radiating plate which is disposed between said metal base plate and said brush base.

5. An electric motor assembly as claimed in claim 4, in which said radiating plate is formed with a plurality of fins.

6. An electric motor assembly as claimed in claim 5, in which said metal base plate and said radiating plate are annular in shape and arranged to surround said rotation shaft.

7. An electric motor assembly as claimed in claim 6, in which said covers of said casing are formed with respective openings thereby to provide said casing with a ventilation passage which includes one of said openings, the interior of said casing and the other of said openings.

8. An electric motor assembly as claimed in claim 7, said pulse width modulating plate on said metal base plate lies within said ventilation passage.

9. An electric motor assembly as claimed in claim 8, in which said fan of said air blower is connected to said rotation shaft in such a manner that upon rotation of the fan, there is produced a negative pressure area at a position near the opening of the cover which has said opening for receiving the rotation shaft.

10. An electric motor assembly as claimed in claim 6, in which said annular metal base plate, said annular radiating plate and said brush base are joined together by bolts.

11. An electric motor assembly for driving an air blower, comprising:
    a motor for driving an air circulating fan in a cooling system;
    a pulse width modulating device electrically connected to said power feeding means for pulse width modulating the electric power from said electric power source;
    a casing enclosing both the modulator circuit and the motor, said pulse width modulating device being installed completely in said casing to prevent radio noises produced by said pulse width modulating device from escaping to the surroundings; and
    metal plates enclosing the modulator circuit, the plates both conducting heat away from the modulator circuit and preventing the radiation of electrical noise from the casing, the interior of the casing, including the enclosing plates, being cooled by the cooling system.

12. The motor assembly of claim 11, further including electrical connections between the modulator circuit and the motor, the connections being as short as possible to reduce the radiation therefrom of electric noise.

* * * * *